United States Patent
Kloeppel et al.

(10) Patent No.: US 6,838,795 B2
(45) Date of Patent: Jan. 4, 2005

(54) LOW VELOCITY, HIGH PRESSURE THRUST PUMP

(75) Inventors: Klaus Dieter Kloeppel, Watsonville, CA (US); Dustin Alan Cochran, Watsonville, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/427,197

(22) Filed: May 1, 2003

(65) Prior Publication Data

US 2003/0205943 A1 Nov. 6, 2003

Related U.S. Application Data

(60) Provisional application No. 60/377,382, filed on May 1, 2002.

(51) Int. Cl.[7] .................................................. H02K 7/08
(52) U.S. Cl. ........................ 310/90; 310/67 R; 384/112; 384/123
(58) Field of Search ................................. 310/90, 67 R; 384/112, 123

(56) References Cited

U.S. PATENT DOCUMENTS

| | | | |
|---|---|---|---|
| 1,982,937 A | * 12/1934 | Walter | .......................... 310/90 |
| 4,065,279 A | 12/1977 | McCullough | |
| 4,956,058 A | 9/1990 | Saito | |
| 5,357,163 A | * 10/1994 | Minakuchi et al. | ........... 310/90 |
| 5,559,382 A | * 9/1996 | Oku et al. | ..................... 310/90 |
| 6,316,857 B1 | * 11/2001 | Jeong | .......................... 310/90 |
| 6,356,408 B1 | * 3/2002 | Nii et al. | ........................ 310/90 |
| 6,398,413 B1 | * 6/2002 | Inoue et al. | ................. 384/123 |
| 6,493,181 B1 | * 12/2002 | Ichiyama | ..................... 384/123 |

FOREIGN PATENT DOCUMENTS

JP         03037413 A  *  2/1991  ........... F16C/33/10

* cited by examiner

Primary Examiner—Karl Tamai
Assistant Examiner—Yahveh Comas
(74) Attorney, Agent, or Firm—Morrison & Foerster LLP

(57) ABSTRACT

A fluid dynamic bearing motor is provided comprising a base, a counter plate fixed to the base, a stationary sleeve fixed to the base and supported on the counter plate, a rotating shaft axially disposed through the sleeve, and a fluid dynamic bearing disposed between the shaft and the sleeve and between a free end of the shaft and a first surface of the counter plate, wherein at least one of the free end of the shaft and the first surface of the counter plate comprises a single spiral-shaped groove formed thereon.

11 Claims, 5 Drawing Sheets

LOW VELOCITY, HIGH PRESSURE THRUST PUMP

CROSS REFERENCE TO RELATED APPLICATIONS

This application claims the priority of U.S. Provisional Application No. 60/377,382, filed May 1, 2002 by Kloeppel et al. (entitled "Low velocity high pressure thrust pump"), which is herein incorporated by reference.

FIELD OF THE INVENTION

The invention generally relates to fluid dynamic bearing motors and more particularly relates to improved designs for thrust bearing grooves.

BACKGROUND OF THE INVENTION

Disk drive memory systems have been used in computers for many years for the storage of digital information. Information is recorded on concentric tracks of a magnetic disk medium, the actual information being stored in the form of magnetic transitions within the medium. The disks themselves are rotatably mounted on a spindle. Information is accessed by a read/write transducer located on a pivoting arm that moves radially over the surface of the rotating disk. The read/write head or transducer must be accurately aligned with the storage tracks on the disk to ensure proper reading and writing of information.

During operation, the disks are rotated at very high speeds within an enclosed housing using an electric motor generally located inside a hub or below the disks, for example an in hub or in spindle motor. The spindle includes bearing components to support the rotation and axial location of the disc stack. Such motors may have a spindle mounted by two ball bearing systems to a motor shaft disposed in the center of the hub. However, with the decreasing size of information storage systems, other types of bearings including fluid dynamic bearings are being developed, such as those useful designs discussed herein.

In these types of bearings, a lubricating fluid, i.e., gas, liquid or air is used in the active bearing region to generate fluid dynamic pressure to prevent metal to metal contact.

The bearing region comprises two relatively rotating surfaces, at least one of which supports or has defined thereon pattern of grooves. The grooves collect fluid in the active bearing region. When the two surfaces of the bearing rotate relative to one another, a pressure profile is created in the gap due to hydrodynamic action. This profile establishes a stabilizing force so that the bearing surfaces rotate freely without contact. In a disc drive, the rotating surface is associated with a hub supporting one or more discs whose rotation and axial location is kept stable by the pressure profile.

The tangential forces created in the bearing area characterize the bearing with respect to changes in shear in the fluid and are summed up in torque, which in turn defines power consumption. The pressure profile defines all forces normal to the bearing surface which characterize the bearing with respect to axial load and radial and angular restoring forces and movement.

A specific fluid dynamic bearing design can be characterized by multiple qualities, including power consumption, damping, stiffness, stiffness ratios and restoring forces and moments.

The design of the fluid dynamic bearing and specifically the groove pattern, is adapted to enhance the stiffness and damping of the rotating system, which includes one or more discs rotating at very high speed. Stiffness is the changing force element per changing distance or gap; damping is the change force element per changing rate of distance or gap. Optimizing these measures reduces non-repeatable run out (NRRO), an important measure of disc drive performance.

A further important issue is the need to maintain the stiffness of the hydrodynamic bearing. The stiffer the bearing, the higher the natural frequencies in the radial and axial direction, so that the more stable is the track of the disc being rotated by a spindle on which reading and writing must occur. Thus the stiffness of the bearing in the absence of any mechanical contact between its relatively rotating parts becomes critical in the design of the bearing so that the rotating load can be stably and accurately supported on the spindle without wobble or tilt.

Current fluid dynamic bearing designs typically employ a combination of radial and axial bearings. The radial bearings typically are formed in a journal (i.e., between two relatively rotating components such as a shaft and a sleeve). Net hydraulic pressure created by the radial bearings establishes a thrust force on the end of the shaft that displaces the shaft axially. A further axial force is generated by a thrust bearing, which typically includes a groove surface located proximate the end of the shaft that is subjected to the thrust force. The combination of radial and axial bearings therefore helps to stabilize the motor.

In several current designs, the axial bearing is provided by a grooved thrust plate; however, a motor may conserve power by employing a thrust plate-less design in which an end surface of the shaft or a counter plate has a grooved surface that faces the end of the shaft to provide the axial bearing surface. In conventional motor designs, the counter plate incorporates a grooved pattern in which multiple chevron or spiral patterns are formed on the bearing surface, such as the patterns illustrated in FIGS. 1 and 2, respectively.

While the bearing groove patterns illustrated in FIGS. 1 and 2 have proven to be effective in providing a stabilizing axial bearing surface, recent testing has shown that such conventional designs do not always provide sufficient pressure to raise or effectively support the shaft off the counter-plate surface as the diameter of the shaft decreases. A design is needed which works with slow relative speeds which is directly related to shaft diameter, because the diameter decreases, the number of grooves which can be formed to define the thrust bearing diminishes with some manufacturing processes; and the stiffness of the bearing falls as the number of grooves is lessened.

Therefore, a need exists for a low power fluid dynamic bearing design for a thrust bearing which is especially effective for smaller diameter shafts.

SUMMARY OF THE INVENTION

The invention is a fluid dynamic bearing motor comprising a base, a counter plate fixed to the base, a stationary sleeve fixed to the base and supported on the counter plate, a rotating shaft axially disposed through the sleeve, and a fluid dynamic bearing disposed between the shaft and the sleeve and between a free end of the shaft and a first surface of the counter plate, wherein at least one of the free end of the shaft and the first surface of the counter plate comprises a spiral-shaped groove formed thereon. Preferably, a single groove is used, either on the end of the shaft or the facing counterplate surface.

The groove design is especially useful with shafts of diameter 2.5 mm or less.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 3:
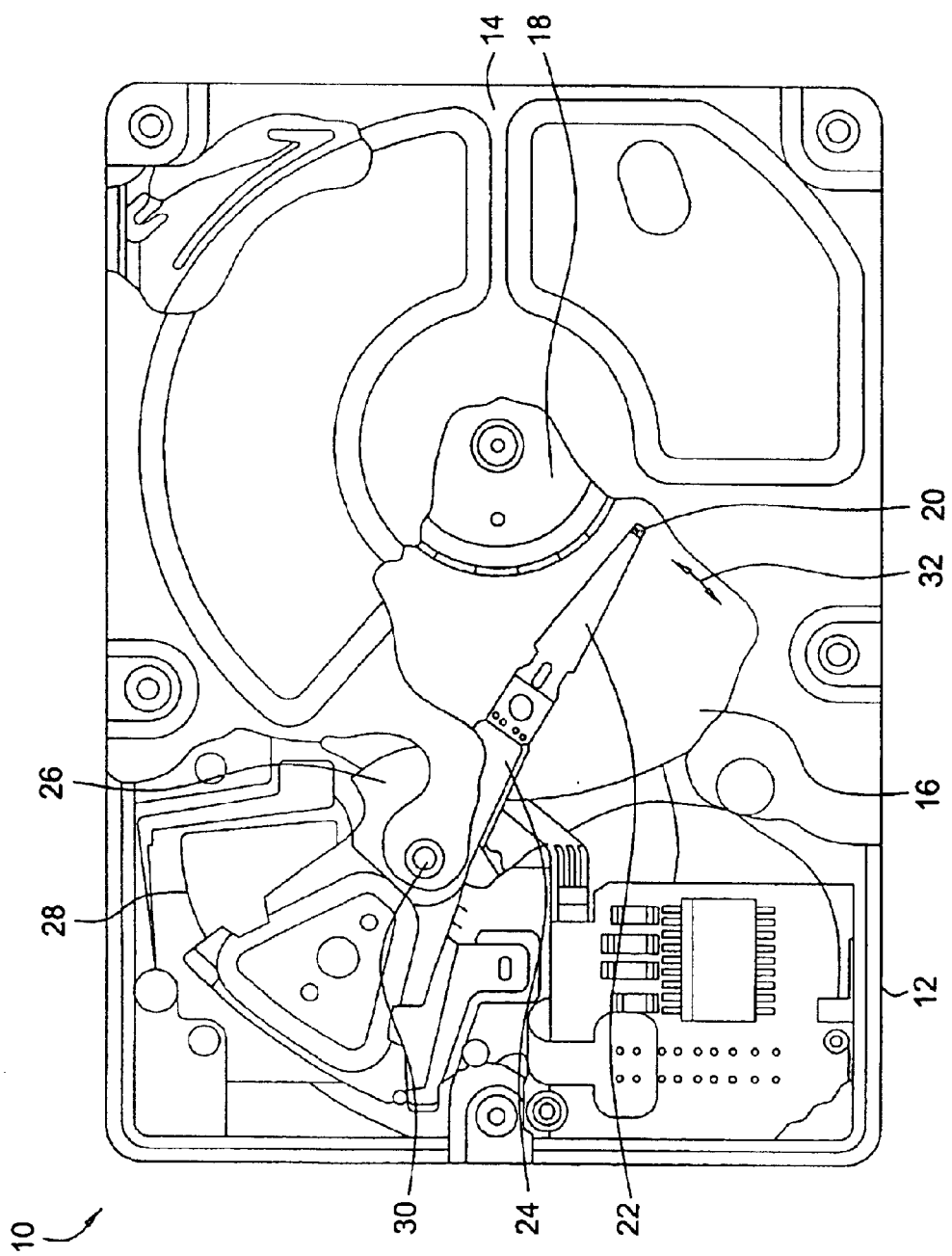
FIG. 3 is a plan view of a disk drive that comprises a motor in which the invention is used.

FIG. 3 depicts a plan view of one embodiment of a disk drive 10 for use with embodiments of the invention. Referring to FIG. 3, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 3 is well known in the industry; however, other arrangements of the housing components have frequently been used, and aspects of the invention are not limited by the particular configuration of the disk drive housing. Disk drive 10 further includes a disk pack 16 that is mounted on a hub 404 (see FIG. 4) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 3, read/write heads 20 are supported by flexures 22 that are in turn attached to head mounting arms 24 of an actuator 26. The actuator shown in FIG. 3 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 4:
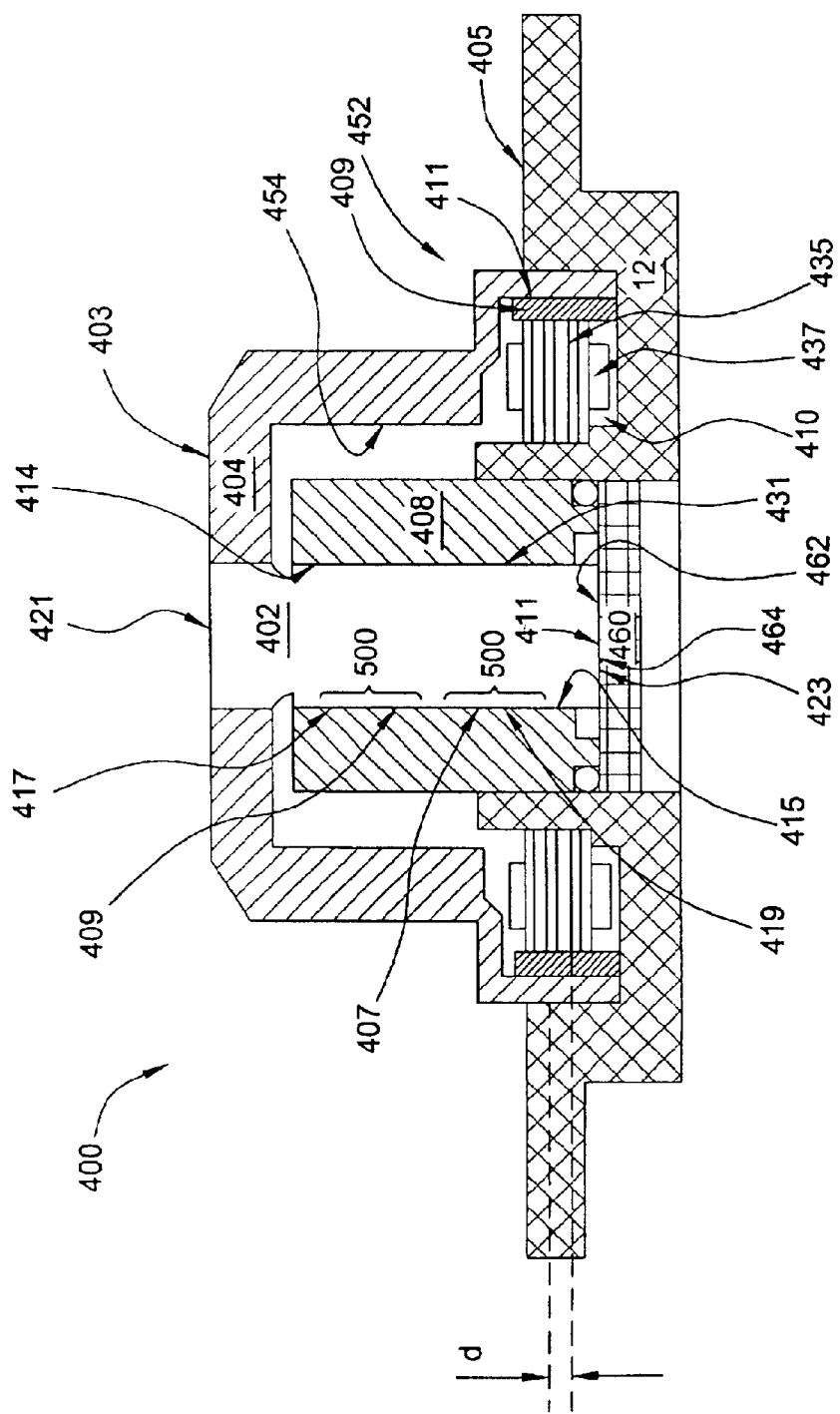
FIG. 4 is a side sectional view of a fluid dynamic bearing motor according to a first embodiment of the invention.

FIG. 4 is a sectional side view of a fluid dynamic bearing motor 400 according to one embodiment of the present invention. The motor 400 comprises a rotating assembly 403, a stationary assembly 405, and a bearing assembly 407.

The rotating assembly 403 comprises a shaft 402, a hub 404, and a magnet assembly 452. The shaft 402 is affixed at a first end 421 to the hub 404, which supports at least one disk (not shown) for rotation. A second free end 423 of the shaft 402 is distal from the first end 421. The hub 404 additionally supports the magnet assembly 452, which comprises a back iron 411 with a magnet 409 affixed thereon. In one embodiment of the invention, the magnet assembly 452 is positioned on the inside circumferential surface 454 of the hub 404.

The stationary assembly 405 comprises a base 12, a sleeve 408, a stator 410, and a counter plate 460. The sleeve 408 is mounted on the base 12. The sleeve 408 further comprises a bore 431 through which the shaft 402 is disposed axially. The stator 410 is mounted on the base 12 and cooperates with the magnet 409 in the hub 404 to induce rotation of the shaft 402 and hub 404 relative to the sleeve 408. The stator 410 comprises a plurality of "teeth" 435 formed of a magnetic material such as steel, where each of the teeth 435 is wound with a winding or wire 437. The stator 410 and magnet 409 may be offset (i.e., the centerlines of the stator 410 and magnet 409 may be separated by vertical distance d) to create a magnetic bias circuit that pre-loads the rotating assembly 403 so that axial displacement of the rotating assembly 403 relative to the stationary assembly 405 during rotation is limited. The counter plate 460 comprises a substantially circular plate that is press fit into the base 12 beneath the sleeve 408 so that a first surface 462 of the counter plate 460 faces the second end 423 of the shaft 402. A thrust gap 464 is defined between the second end 423 of the shaft 402 and the first surface 462 of the counter plate 460.

The bearing assembly 407 comprises a radial bearing 409 and an axial bearing 411. The radial bearing 409 is formed in a journal (or gap) 417 defined between the facing surfaces of the inner diameter 415 of the sleeve 408 and the outer diameter 419 of the shaft 402. A fluid 414 such as air, oil or gas is disposed in the journal 417. The journal 417 further comprises hydrodynamic grooves 500 (shown in FIG. 5) formed on one or both of the interfacial surfaces 415, 419.

As the hub 404 rotates, a net hydraulic pressure is generated by the journal bearing grooves 500 toward the second end 423 of the shaft 402. Pressure is also generated as a function of the size of the gap between the shaft 402 and sleeve 408 in the areas of the grooves 500. This pressure exerts a positive thrust force on the second end 423 of the shaft 402 that displaces the shaft 402 axially. Furthermore, when a stator/magnet offset is employed as described above, the hub 404 and shaft 402 are further biased downward toward the counter plate 460 by the magnetic circuit.

Figure 2:
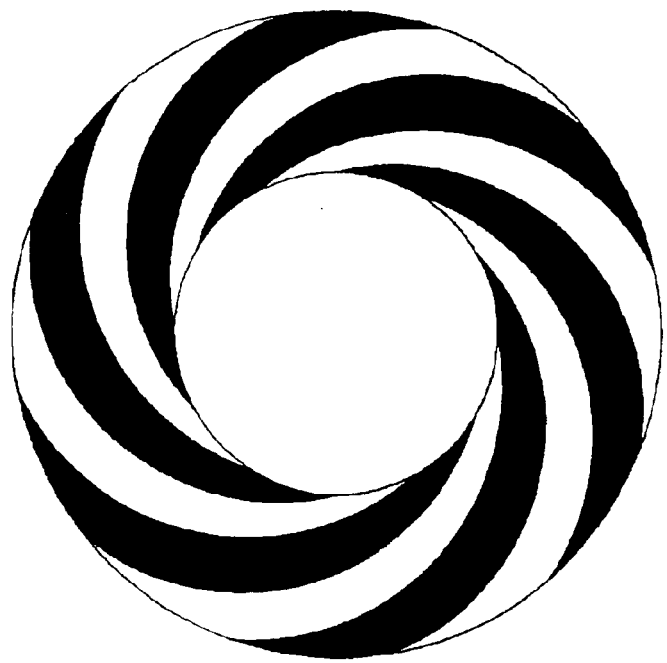
FIG. 2 is a plan view of a second embodiment of a conventional axial bearing groove pattern.
Figure 1:
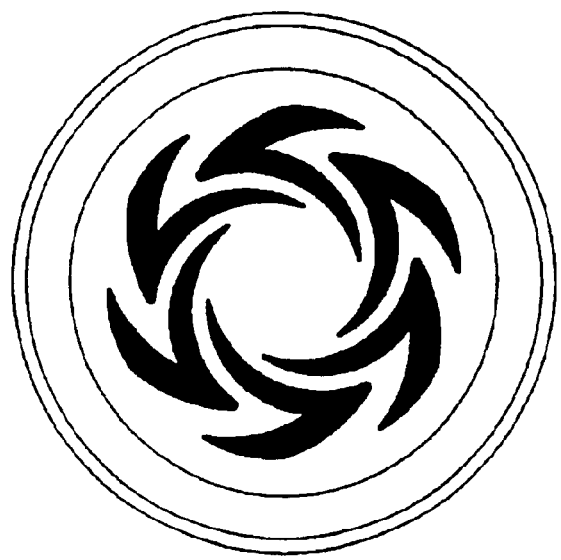
FIG. 1 is a plan view of one embodiment of a conventional axial bearing groove pattern.
Figure 5:
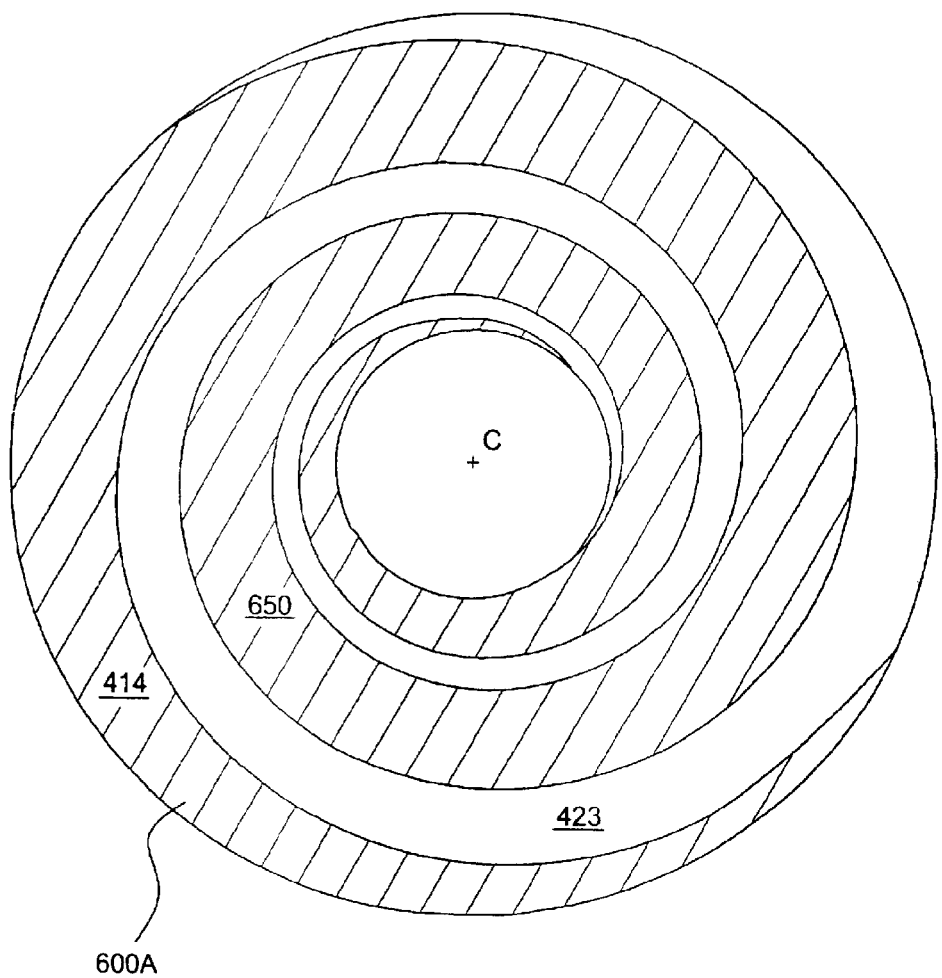
FIG. 5 is an isometric view of one embodiment of a grooved axial bearing formed on a rotating motor component according to the present invention.

FIG. 5 is a plan view of one embodiment of the axial bearing 411 of FIG. 4. To balance the hydraulic pressure and/or the magnetic bias acting on the shaft 402, the second end 423 of the shaft 402 is grooved with a fluid pumping pattern 600a. The groove pattern 600a comprises a single, continuous spiral groove formed into the second end 423 of the shaft 402, as opposed to conventional designs including those illustrated in FIGS. 1A and 1B that utilize multiple grooves (for example, chevron or spiral patterns). The single spiral pattern 600a facilitates pumping of fluid 214 toward the center of the bearing 411.

Shear effect pumps the fluid 414 through the spiral cavity 650 toward the center C of the pattern 600a, where the fluid 414 becomes trapped within the pattern 600a and cannot escape to the outer diameter D of the shaft 402. As can be seen, as fluid is pumped toward the center, the cavity becomes smaller; thus the fluid 414 builds up at the center C and creates a pressurized column that lifts the end 423 of the shaft 402 vertically relative to the counter plate 460, thereby supporting the for rotation during motor operation. The simplicity and compactness of the pattern 600a allows it to be employed on the limited axial bearing surface space on the end 423 of the shaft 402. Therefore, the effects of a conventional thrust plate are achieved without increasing axial bearing space, which keeps motor power consumption relatively low.

Figure 6:
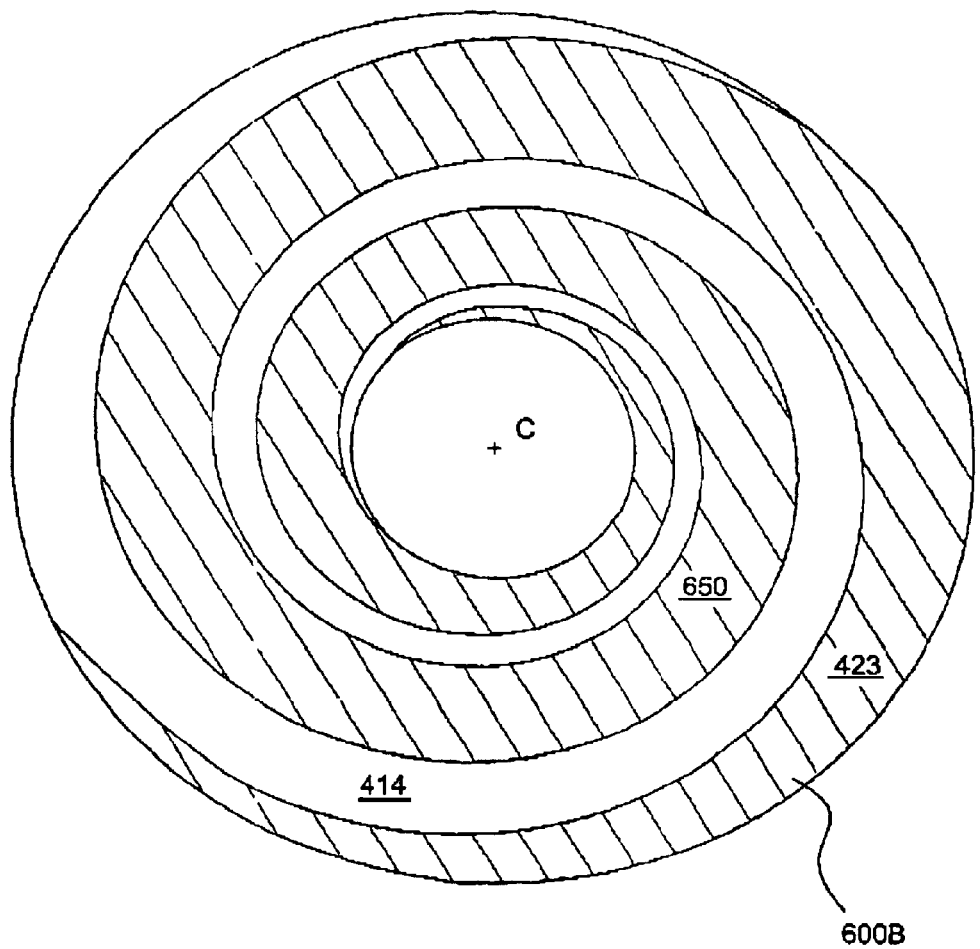
FIG. 6 is a plan view of one embodiment of a grooved axial bearing formed on a stationary motor component according to the present invention.

FIG. 6 is a plan view of a second embodiment of the axial bearing 411 of FIG. 4. In one embodiment, the first surface 462 of the counter plate 460 is grooved with a fluid pumping pattern 600b. The groove pattern 600b is substantially the same as that described with reference to FIG. 5A and comprises a single, continuous spiral groove formed into the first surface 462 of the counter plate 460. The effects achieved are substantially similar to those achieved by grooving the second end 423 of the shaft 402.

In a further alternative embodiment, an axial thrust bearing pattern comprise dual spiral groove patterns one on each surface of the shaft and thrust plate (Refer to FIG. 4). The first spiral groove is formed on the first surface 462 of the counter plate 460 (i.e., the stationary surface of the bearing 411), (see FIG. 6); and the second spiral groove (see FIG. 5) is formed on the second end 423 of the shaft 402 (i.e., the rotating surface of the bearing 411). Therefore, one spiral groove remains fixed in place while the second spiral groove rotates relative to the first groove when the motor is in operation.

Relative rotation of the spiral groove patterns creates small cavities between and along the lengths of the grooves, and fluid 414 accumulates in these cavities as the fluid 414 as the motor spins. As the grooves rotate relative to each other, the size and location of the cavities n along the length of the spirals continuously changes and forces the fluid 414 further toward the common center C of the patterns. For example, an amount a fluid 414 trapped in a cavity near the outer ends of the spirals is forced progressively inward toward smaller cavities (and toward the center C) as the spirals rotate relatively. Therefore, the shear effect that moves the fluid 414 through the axial bearing grooves is enhanced, and the build up of fluid 414 within the progressively smaller cavities lifts and supports the end 423 of the shaft 402 axially relative to the counter plate 460 during motor operation.

Thus the present invention represents a significant advancement in the field of fluid dynamic bearing motor design. Motor and bearing wear is significantly reduced by providing an axial thrust bearing with enhanced fluid pumping that forces the shaft axially away from the counterplate to counter opposedly acting radial and/or magnetic forces. The axial thrust bearing is simple and compact enough to be formed on a counter plate and/or an end of the shaft, so that motor power consumption is kept relatively low. The design is especially useful in small diameter motors of 2.5 mm or less. It should be noted that the cavities are of constant or variable depth; also the cross section may be varied without department from the scope of the invention.

While the foregoing is directed to embodiments of the invention, other and further embodiments of the invention may be devised without departing from the basic scope thereof, and the scope thereof is determined by the claims that follow.

What is claimed is:

1. A fluid dynamic bearing system, comprising:
   an outer member;
   an inner member disposed within the outer member, the inner member having a first end that includes a first single spiral-shaped groove;
   a counter plate having a first surface that faces the first end and includes a second single spiral-shaped groove, the counter plate disposed such that the second single spiral-shaped groove is substantially aligned with the first single spiral-shaped groove;
   a fluid dynamic thrust bearing disposed between the first end and the first surface and including the first single spiral-shaped groove and the second single spiral-shaped groove, the fluid dynamic thrust bearing configured to support the relative rotation between the outer member and the inner member; and
   a fluid dynamic journal bearing disposed between the outer member and the inner member and configured to support the relative rotation between the outer member and the inner member.

2. The fluid dynamic bearing system of claim 1, wherein the first single spiral-shaped groove has the same orientation as the second single spiral-shaped groove.

3. The fluid dynamic bearing system of claim 2, wherein the first single spiral-shaped groove and the second single spiral-shaped groove rotate relative to one another.

4. The fluid dynamic bearing system of claim 3, wherein the relative rotation of the first single spiral-shaped groove and the second single spiral-shaped groove forms a plurality of cavities between and along the first single spiral-shaped groove and the second single spiral-shaped groove.

5. The fluid dynamic bearing system of claim 4, wherein the cavities become progressively smaller from an outer end to a center of each of the first single spiral-shaped groove and the second single spiral-shaped groove.

6. The fluid dynamic bearing system of claim 5, wherein the cavities are adapted to trap fluid therein.

7. The fluid dynamic bearing system of claim 6, wherein the relative rotation of the first single spiral-shaped groove and the second single spiral-shaped groove forces the fluid toward smaller cavities, and the accumulation of fluid within the smaller cavities generates pressure within the fluid dynamic thrust bearing.

8. The fluid dynamic bearing system of claim 2, wherein the inner member comprises a shaft configured to rotate within the outer member and further comprising a hub coupled to a second end of the shaft and configured to support at least one disc, a magnet coupled to the hub and a stator coupled to either the outer member or a base, the magnet and the stator offset to create an axial bias force on the hub.

9. The fluid dynamic bearing of claim 2, wherein the inner member comprises a stationary shaft and further comprising a hub coupled to the outer member proximally to the first end of the shaft and configured to support at least one disc, a magnet coupled to the hub and a stator coupled to a base, the magnet and the stator offset to create an axial bias force on the hub.

10. The fluid dynamic bearing system of claim 2, wherein the fluid dynamic bearing system is disposed within a disc drive.

11. The fluid dynamic bearing system of claim 1, wherein the inner member comprises a shaft having a diameter of 2.5 mm or less.

* * * * *